W. WENSE.
METHOD OF DRYING AIR FOR METALLURGICAL USES.
APPLICATION FILED JUNE 13, 1912.
1,169,371.
Patented Jan. 25, 1916.
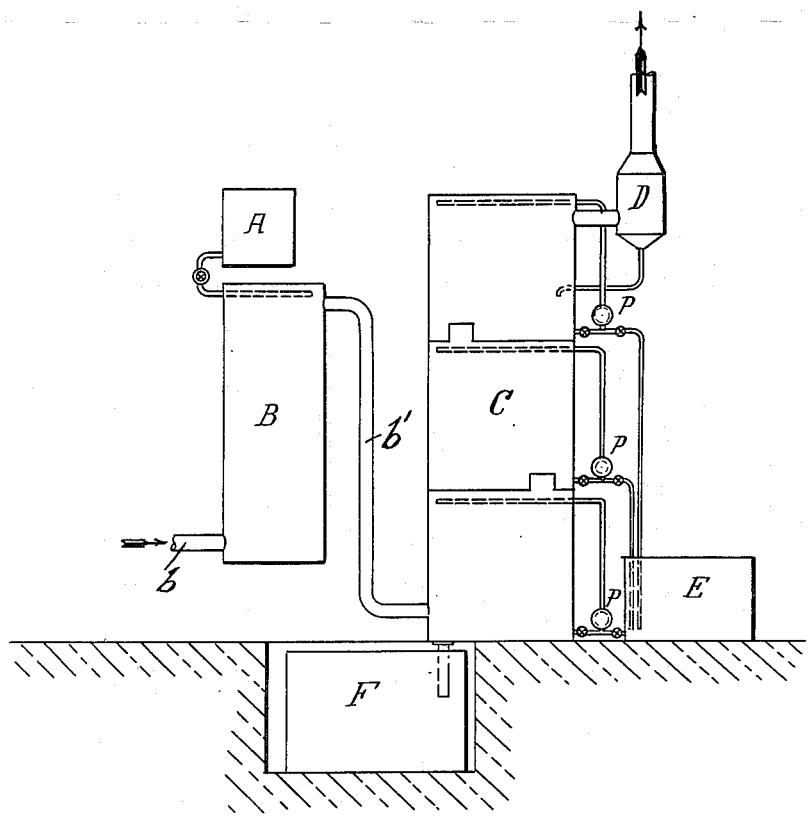

UNITED STATES PATENT OFFICE.

WILHELM WENSE, OF GRIESHEIM-ON-THE-MAIN, GERMANY, ASSIGNOR TO CHEMISCHE FABRIK GRIESHEIM-ELEKTRON, OF FRANKFORT-ON-THE-MAIN, GERMANY, A CORPORATION OF GERMANY.

METHOD OF DRYING AIR FOR METALLURGICAL USES.

1,169,371.  Specification of Letters Patent.  Patented Jan. 25, 1916.

Application filed June 13, 1912. Serial No. 703,540.

*To all whom it may concern:*

Be it known that I, WILHELM WENSE, a subject of the Emperor of Germany, and resident of Griesheim-on-the-Main, Germany, have invented certain new and useful Improvements in Methods of Drying Air for Metallurgical Uses, of which the following is a specification.

This invention has for its object to provide efficient and economical means for obtaining dry air for supply to blast furnaces and other like furnaces.

Within recent years it has been found that the use of dry air in blast furnaces for the production of iron presents great advantages as regards the consumption of fuel and the maintenance of the production and that the working of blast furnaces is thereby rendered uniform. For drying air the following means have, as far as is known hitherto been tried on a large scale, or are used practically.

1. *Concentrated sulfuric acid.*—According to Harrison (*Chemische Zeitung* 1911, 560) this has not been successful, as owing to its corrosive effects, sulfuric acid requires a costly installation and the reconcentration of the acid is very expensive.

2. *Calcium chlorid.*—This is used at Differdingen but from data given in "*Stahl und Eisen*" for 18 May 1911 it is seen that the use of calcium chlorid requires a large installation and inconvenient periodic working, as it is clear that the air is in contact with the stationary solid material in pieces for a much longer time than is the case with a liquid which is capable of being finely distributed and readily kept in motion, and that the employment of calcium chlorid therefore involves the use of drying apparatus of very large dimensions.

3. *Anhydrous sulfates used according to Harbord's German specification No. 203,087 of 1907.*—Nothing is known about the use of these in practical work and it does not appear to have been applied commercially.

4. *Cooling the air down to $-5°$ centigrade according to Gayley.*—Many large works already work according to this process. It implies however a very large installation and is expensive in operation (*Zeitschrift des Vereins Deutscher Ingenieure*, 1909, 77).

I have found that the air for supply to blast and other like furnaces can be very economically and satisfactorily dried by means of strong solutions of either caustic soda, or caustic potash. Solid alkali has already been used as a drying material for gas for other purposes, but for drying air for blast and other like furnaces advantageous results have not been obtained by its use, but solutions of caustic soda, or potash, give much better results although they have in themselves less drying effect than solid alkalis. The drying action of such solutions is however sufficient notwithstanding the speed at which the air must be passed through such solutions. The fact that it is possible to dry air rapidly and to a very great extent for the working of blast or other like furnaces by means of solutions of caustic soda, or potash, has not hitherto been known. In technical literature no data are to be found as to the pressure of the vapor of alkaline solutions required in the case of air for blast or other like furnaces. Lescoeur (*Comptes Rendus* 103, 1260) and Fittica (*Jahresberichte für Chemie*, 1886, 1, 151) give for soda and potash a figure for temperatures between $0°$ and $30°$ centigrade, namely for $20°$ centigrade, but only for the extreme case of fully saturated solutions which are not generally suitable for employment on account of technical objections to the use of such strong solutions. Although the alkali solutions do not produce as high a drying action as sulphuric acid, or calcium chlorid, it is nevertheless possible, for the purposes of this invention, to obtain a better result with solutions of caustic soda, or potash, than with the Gayley process which has met with some success in practice, but dries the air only to such an extent that it still contains up to 3.4 grams of water per cubic meter at $-5°$ centigrade.

The following results have been obtained with the use of solutions of caustic soda and potash according to this invention:

| Caustic solution. | Temperature. | Water content of the dried air per cubic meter at 0° centigrade and 760 mm. pressure. |
|---|---|---|
| (1) 50.8 per cent. KOH; 1.2 per cent. $K_2CO_3$. | 13° centigrade. | 1.11 to 1.25 grams. |
| (2) Do. | 26° " | 2.65 to 3.11 grams. |
| (3) 49.0 per cent. NaOH; 0.6 per cent. $Na_2CO_3$. | 13° " | 1.00 to 1.02 grams. |
| (4) Do. | 26° " | 2.38 to 2.42 grams. |

From these figures it will be seen that the lower the temperature the more perfect is the drying. It is therefore advisable to cool the air and the solution to as low a temperature as it is economically practicable. The following is an example of how this invention can be carried out into practice, but the invention is of course not limited to this precise example. The air is treated with the solution of caustic soda, or potash, in towers, preferably in parallel currents, the air and solution being passed through several towers arranged in series, the first one being supplied with the more dilute solution already used in the other tower, or towers, while the last tower is supplied with fresh solution. The reconcentration of the solutions can be effected in any suitable evaporating apparatus, for instance in open pans heated by gases from the blast, or other, furnace, or in multiple effect evaporators operating under a vacuum. As the evaporation of the solution takes place as hereinafter explained without any separation of salt, the process can be carried out with very simple apparatus.

The carbon dioxid contained in the air might, owing to the separation of carbonate, disturb the operation of the drying and evaporating apparatus because caustic alkaline solutions, especially soda solution, can hold but little dissolved carbonate. For this reason it is advisable to previously absorb the carbon dioxid from the air, which can be done in a special apparatus by any suitable, or known, method. This has the further advantage that lesser quantities of water have to be evaporated than when the carbon dioxid is allowed to be absorbed along with the water in the drying apparatus. In both cases it is necessary to convert again much carbonate into caustic alkali (causticizing), which operation is only possible in dilute solution. In the first case however the more dilute solution can be used again directly for the absorption of the carbon dioxid, while in the second case the solution should be evaporated down to about 50 per cent. at least. The water content of the fresh air may be increased on it being treated with the more dilute solution, as such solution, during the greater part of the year, has no drying, but a humidifying, action of the air. The working can however be so carried out (as it is possible to do without the complete causticizing operation in the mode of working proposed) that the complete causticized solution is maintained at a strength at which it will cede considerably less water to the air than must be evaporated from the caustic solution in the other mode of working.

Caustic alkalis have over the drying means hitherto proposed also the incidental advantage that they remove also carbon dioxid from the air, this carbon dioxid, like water, requiring in blast furnace uselessly spent heat for decomposition by the incandescent charge of the furnace.

In the accompanying drawing there is illustrated, more or less diagrammatically, an apparatus adapted for carrying out the hereinbefore described method.

Referring to the drawing B designates a cylinder to which air is supplied by a pipe $b$ and within which it is freed from carbon dioxid by any suitable means, as by treatment with milk of lime supplied from a reservoir A. From the cylinder B the air passes through a conduit $b'$ to the lower portion of a tower C to which is admitted a solution of a suitable caustic alkali. The moisture removing solution is contained in a tank E which is suitably connected with the interior of the tower C, at different elevations, as through conduits and pumping devices P. The dried air escapes from a pipe at the upper end of the tower which may be provided with an enlarged portion D communicating with the interior of the tower to receive any particles of moisture that may be deposited therein. A tank or receptacle F is provided to receive the saturated liquid flowing from the lower end of the tower C.

Having thus described the invention what is claimed and desired to be secured by Letters-Patent is:

1. The hereindescribed method of drying air for metalurigcal uses, comprising exposing the air to the action of a strong solution of caustic alkali.

2. The hereindescribed method of drying air for metallurgical uses comprising preliminarily treating the air to remove carbon dioxid therefrom and subsequently exposing the air to the action of a solution of caustic alkali.

3. The hereindescribed method of drying air for metallurgical uses comprising circulating the air through a chamber in which it is subjected to the action of a spray of a caustic alkali solution.

4. The hereindescribed method of drying air for metallurgical uses comprising circulating the air through a chamber in which it is subjected to the action of a spray of a caustic alkali solution, the air and spray moving through said chamber in opposite directions.

In testimony whereof I have signed my name to this specification in the presence of two subscribing witnesses.

WILHELM WENSE.

Witnesses:
  FRANZ HASSLACHER,
  MICHAEL VOLK.